(12) United States Patent
Takahashi et al.

(10) Patent No.: US 10,740,172 B2
(45) Date of Patent: Aug. 11, 2020

(54) COMMUNICATION APPARATUS, COMMUNICATION METHOD, PROGRAM, AND COMMUNICATION SYSTEM

(71) Applicant: Sony Corporation, Tokyo (JP)

(72) Inventors: Hiroo Takahashi, Kanagawa (JP); Takashi Yokokawa, Kanagawa (JP); Sonfun Lee, Kanagawa (JP); Naohiro Koshisaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/099,296

(22) PCT Filed: May 2, 2017

(86) PCT No.: PCT/JP2017/017220
§ 371 (c)(1),
(2) Date: Nov. 6, 2018

(87) PCT Pub. No.: WO2017/199760
PCT Pub. Date: Nov. 23, 2017

(65) Prior Publication Data
US 2019/0213070 A1 Jul. 11, 2019

(30) Foreign Application Priority Data

May 18, 2016 (JP) ................. 2016-099954

(51) Int. Cl.
*G06F 11/10* (2006.01)
*G06F 13/42* (2006.01)
*H04L 5/00* (2006.01)

(52) U.S. Cl.
CPC ...... *G06F 11/1004* (2013.01); *G06F 13/4291* (2013.01); *H04L 5/0055* (2013.01); *G06F 2213/0016* (2013.01); *G06F 2213/24* (2013.01)

(58) Field of Classification Search
CPC ............. G06F 11/1004; G06F 13/4291; G06F 2213/0016; G06F 2213/24; H04L 5/0055
See application file for complete search history.

(56) References Cited

U.S. PATENT DOCUMENTS

| 5,724,606 A | * | 3/1998 | Stevens ................. G06F 3/0227 710/1 |
| 2010/0146359 A1 | * | 6/2010 | Duan .................... H04L 1/1628 714/750 |

(Continued)

FOREIGN PATENT DOCUMENTS

| EP | 2 555 122 A2 | 2/2013 |
| EP | 2 722 761 A1 | 4/2014 |

(Continued)

OTHER PUBLICATIONS

NXP Semiconductors, "UM10204 I 2C-bus specification and user manual Rev. 6—Apr. 4, 2014," NXP Semiconductors N.V. 2014, Published: Apr. 4, 2014, pp. 1-64. (Year: 2014).*

(Continued)

*Primary Examiner* — Kyle Vallecillo
(74) *Attorney, Agent, or Firm* — Michael Best & Friedrich LLP (57) ABSTRACT

There is provided a communication apparatus, including: a transmission/reception unit that transmits/receives a signal to/from a different apparatus; a confirmation signal detection unit that detects one of a reception confirmation signal and a non-reception confirmation signal, the reception confirmation signal and the non-reception confirmation signal being transmitted from the different apparatus that has received the signal transmitted from the transmission/reception unit; and a conflict avoiding unit that instructs the transmission/reception unit to transmit an abort signal for instructing to interrupt communication after ignoring a predetermined number of bits following the non-reception (Continued)

confirmation signal when the confirmation signal detection unit has detected the non-reception confirmation signal.

19 Claims, 7 Drawing Sheets

(56) References Cited

U.S. PATENT DOCUMENTS

| | | | | |
|---|---|---|---|---|
| 2012/0331183 | A1* | 12/2012 | Hess | G06F 13/00 |
| | | | | 710/19 |
| 2014/0029587 | A1* | 1/2014 | Hirata | H04L 5/0055 |
| | | | | 370/336 |
| 2015/0230112 | A1* | 8/2015 | Siomina | G01S 5/0205 |
| | | | | 370/252 |

FOREIGN PATENT DOCUMENTS

| | | |
|---|---|---|
| JP | 2000-099448 A | 4/2000 |
| JP | 2002-175269 A | 6/2002 |
| JP | 2003-122707 A | 4/2003 |
| JP | 2005-084791 A | 3/2005 |
| JP | 2014-208710 A | 11/2017 |
| JP | 2017-207934 A | 11/2017 |
| JP | 2017-208713 A | 11/2017 |
| JP | 2018-518215 A | 11/2017 |
| WO | 2017-199862 A1 | 11/2017 |

OTHER PUBLICATIONS

Oudjida, A.K., "Universal Low/Medium Speed I2 C-Slave Transceiver: a Detailed VLSI Implementation," International Conference on Design and Test of Integrated Systems in Nanoscale Technology, IEEE, Conference Location: Tunis, Tunisia, Date of Conference: Sep. 5-7, 2006, pp. 1-7. (Year: 2006).*

Japanese Office Action dated May 26, 2020 for corresponding Japanese Application No. 2016-099954.

* cited by examiner

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system, and particularly to a communication apparatus, a communication method, a program, and a communication system that are capable of performing communication more reliably.

CROSS REFERENCE TO RELATED APPLICATIONS

This application claims the benefit of Japanese Priority Patent Application JP 2016-099954 filed May 18, 2016, the entire contents of which are incorporated herein by reference.

BACKGROUND ART

In the past, for example, an I2C (Inter-Integrated Circuit) has been often used as a bus IF (Interface) used for communication between a plurality of devices via a bus in a board on which the plurality of devices are mounted.

Further, in recent years, an increase in the speed of the I2C is desired to be achieved, and an I3C (Improved inter Integrated Circuit) is being prescribed as the next-generation standards. In the I3C, a master and a slave are capable of performing bidirectional communication by using two signal lines. For example, data transfer (write transfer) from the master to the slave and data transfer (read transfer) from the slave to the master is performed.

For example, in Japanese Patent Application Laid-open No. 2000-99448, a digital data processing system in which a host processor and a sub-system controller are connected to each other by the I2C is disclosed. Further, in Japanese Patent Application Laid-open No. 2002-175269, a method of realizing a communication protocol arranged in the layered state on the upper part of a standard I2C protocol is disclosed.

CITATION LIST

Patent Literature

PTL 1: Japanese Patent Application Laid-open No. 2000-99448

PTL 2: Japanese Patent Application Laid-open No. 2002-175269

SUMMARY OF INVENTION

Technical Problem

Incidentally, although it is prescribed that error detection with parity, CRC (Cyclic Redundancy Check), and the like, is performed in a master or slave in the above-mentioned I3C, for example, also a signal for which such error detection is not prepared is transmitted/received. For that reason, there is fear that it is difficult for the master or slave to perform normal communication when an error has occurred in the signal for which error detection is not prepared.

The present disclosure has been made in view of the above circumstances to be able to perform communication more reliably.

Solution to Problem

A communication apparatus according to a first aspect of the present disclosure includes a transmission/reception unit that transmits/receives a signal to/from a different apparatus; a confirmation signal detection unit that detects one of a reception confirmation signal and a non-reception confirmation signal, the reception confirmation signal and the non-reception confirmation signal being transmitted from the different apparatus that has received the signal transmitted from the transmission/reception unit; and a conflict avoiding unit that instructs the transmission/reception unit to transmit an abort signal for instructing to interrupt communication after ignoring a predetermined number of bits following the non-reception confirmation signal when the confirmation signal detection unit has detected the non-reception confirmation signal.

A communication method or program according the first aspect of the present disclosure includes transmitting/receiving a signal to/from a different apparatus; detecting one of a reception confirmation signal and a non-reception confirmation signal, the reception confirmation signal and the non-reception confirmation signal being transmitted from the different apparatus that has received the transmitted signal; and transmitting an abort signal for instructing to interrupt communication after ignoring a predetermined number of bits following the non-reception confirmation signal when the non-reception confirmation signal has been detected.

In the first aspect of the present disclosure, a signal is transmitted/received to/from a different apparatus; one of a reception confirmation signal and a non-reception confirmation signal is detected, the reception confirmation signal and the non-reception confirmation signal being transmitted from the different apparatus that has received the transmitted signal; and an abort signal for instructing to interrupt communication after ignoring a predetermined number of bits following the non-reception confirmation signal is transmitted when the non-reception confirmation signal has been detected.

A communication system according to a second aspect of the present disclosure includes a first communication apparatus that takes an initiative in control in a bus; and a second communication apparatus that performs communication in accordance with control by the first communication apparatus, in which the first communication apparatus includes a transmission/reception unit that transmits/receives a signal to/from the second communication apparatus, a confirmation signal detection unit that detects one of a reception confirmation signal and a non-reception confirmation signal, the reception confirmation signal and the non-reception confirmation signal being transmitted from the second communication apparatus that has received the signal transmitted from the transmission/reception unit, and a conflict avoiding unit that instructs the transmission/reception unit to transmit an abort signal for instructing to interrupt communication after ignoring a predetermined number of bits following the non-reception confirmation signal when the confirmation signal detection unit has detected the non-reception confirmation signal.

In the second aspect of the present disclosure, communication is performed between a first communication apparatus that takes an initiative in control in a bus and a second communication apparatus that performs communication in accordance with control by the first communication apparatus. In the first communication apparatus, a signal is transmitted/received to/from the second communication apparatus; one of a reception confirmation signal and a non-reception confirmation signal is detected, the reception confirmation signal and the non-reception confirmation signal being transmitted from the second communication apparatus that has received the transmitted signal; and an abort signal for instructing to interrupt communication after ignoring a predetermined number of bits following the non-reception confirmation signal is transmitted when the non-reception confirmation signal has been detected.

Advantageous Effects of Invention

According to the first and second aspects of the present disclosure, it is possible to perform communication more reliably.

DESCRIPTION OF EMBODIMENTS

Hereinafter, specific embodiments to which the present technology is applied will be described in detail with reference to drawings.

<Configuration Example of Bus IF>

Figure 1:
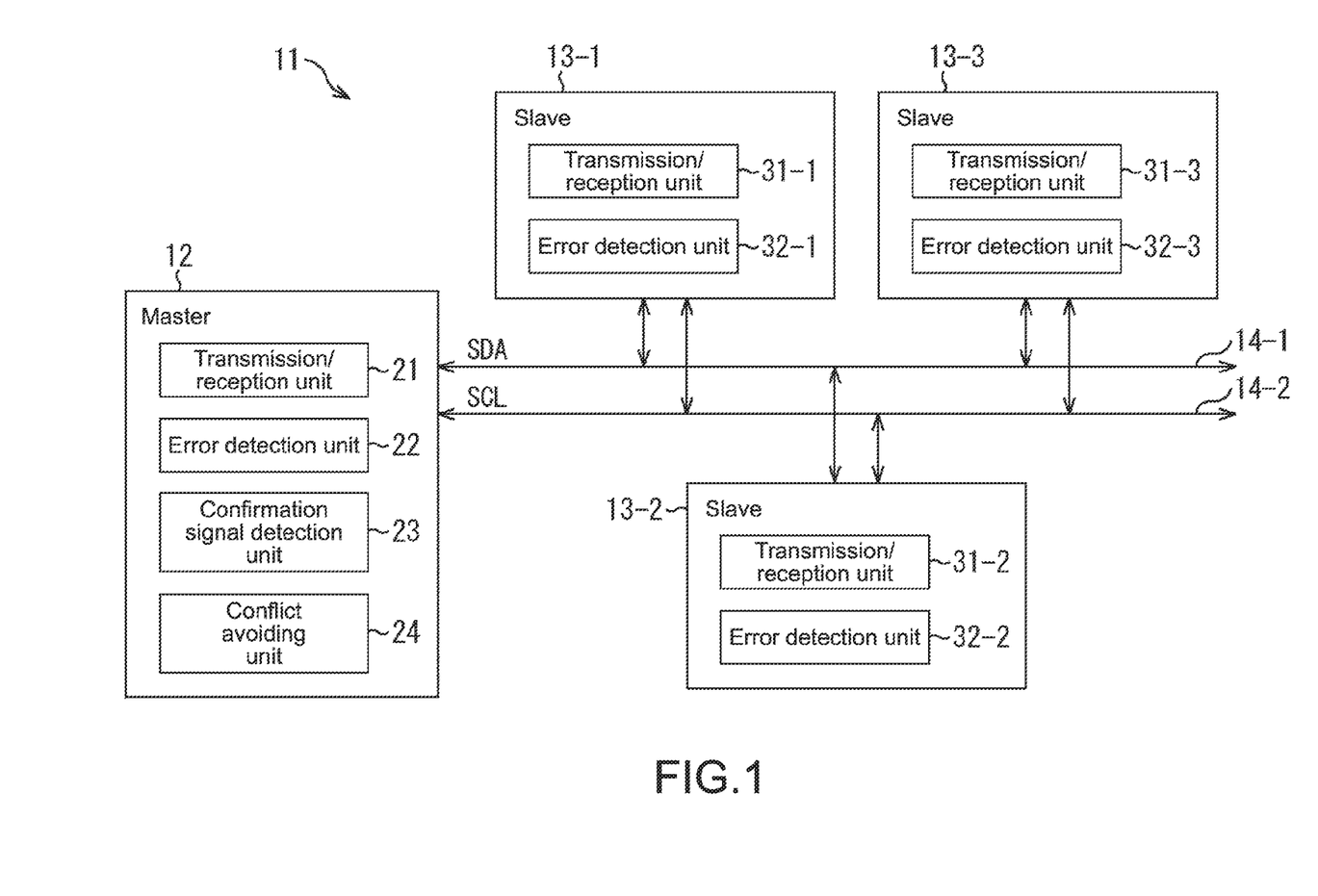
FIG. 1 is a block diagram showing a configuration example of an embodiment of a bus IF to which the present technology is applied.

FIG. 1 is a block diagram showing a configuration example of an embodiment of a bus IF to which the present technology is applied.

A bus IF 11 shown in FIG. 1 includes a master 12 and three slaves 131 to 13-3, which are connected to each other via a data signal line 144 and a clock signal line 14-2.

The master 12 takes the initiative in control in the bus IF 11, and is capable of communicating with the slaves 13-1 to 13-3 via the data signal line 14-1 and the clock signal line 14-2.

The slaves 13-1 to 13-3 are each capable of communicating with the master 12 via the data signal line 14-1 and the clock signal line 14-2 under control of the master 12. Note that the slaves 13-1 to 13-3 are configured similarly, and referred to simply as the slave 13 in the case where they do not need to be distinguished, in the following. The same shall apply to each block constituting the slave 13.

The data signal line 14-1 and the clock signal line 14-2 are used to transmit a signal between the master 1:2 and the slave 13. For example, in the bus IF 11, serial data (SDA) is successively transmitted one bit at a time via the data signal line 14-1, and a serial clock (SCL) having a predetermined frequency is transmitted via the clock signal line 14-2.

Further, in the bus IF 11, a plurality of transmission methods with different communication rates are prescribed conforming to the I3C standard, and the master 12 is capable of switching between the transmission methods. For example, in the bus IF 11, an SDR (Standard Data Rate) mode and an MDR (High DataRate) mode are prescribed depending on the transfer rate of data. Data communication is performed at a normal transfer rate in the SDR mode and data communication is performed at a transfer rate higher than that in the SDR mode in the HDR mode. Further, in the HDR mode, three modes of a DDR (Double Data Rate) mode, a TSP (Ternary Symbol Pure-Bus) mode, and a TSL (Ternary Symbol Legacy-inclusive-Bus) mode are defined by the standards. Note that in the bus IF 11, it is prescribed that communication is performed in the SDR mode when the communication is started.

The master 12 includes a transmission/reception unit 21, an error detection unit 22, a confirmation signal detection unit 23, and a conflict avoiding unit 24.

The transmission/reception unit 21 transmits/receives a signal to/from the slave 13 via the data signal line 14-1 and the clock signal line 14-2. For example, the transmission/reception unit 21 transmits a signal to the slave 13 by driving the data signal line 14-1 (switching the potential to an H level or L level) in accordance with timing of serial clocks transmitted by driving the clock signal line 14-2. Further, the transmission/reception unit 21 receives a signal transmitted from the slave 13 that drives the data signal line 14-1 in accordance with timing of serial clocks of the clock signal line 14-2. Note that the driving of the clock signal line 14-2 is performed by the side of the master 12.

The error detection unit 22 detects that the signal received by the transmission/reception unit 21 has an error. For example, the error detection unit 22 is capable of detecting an error by performing parity check or cyclic redundancy check (CRC) on the signal received by the transmission/reception unit 21 or checking a token issued when the transmission right is transferred from the slave 13 to the master 12. Then, in the case where the error detection unit 22 detects that the signal received by the transmission/reception unit 21 has an error, the error detection unit 22 is capable of instructing the transmission/reception unit 21 to perform communication with the slave 13 again from the beginning, for example.

For example, the error detection unit 22 detects that an error has occurred by performing parity check on the data received by the transmission/reception unit 21 with one bit out of parity of two bits contained in the data transmitted from the slave 13 as an even-numbered parity and the other bit as an odd-numbered parity. Accordingly, the error detection unit 22 is capable of detecting whether or not the data is correct even when neither the master 12 nor the slave 13 drives the data signal line 14-1.

The confirmation signal detection unit 23 confirms whether or not the slave 13 has successfully received a command, data, or the like by detecting ACK (reception confirmation signal) or NACK (non-reception confirmation signal) transmitted from the slave 13 that has received the signal transmitted from the transmission/reception unit 21. For example, in the bus IF 11, it is prescribed that the slave 13 transmits ACK to the master 12 when an error has not occurred in the signal and the slave 13 has successfully received a command, data, or the like. Further, in the bus IF 11, it is described that the slave 13 transmits NACK to the master 12 when an error has occurred in the signal and the slave 13 has failed in the reception of a command, data, or the like.

Therefore, in the case where the confirmation signal detection unit 23 detects ACK transmitted from the slave 13 from a command, data, or the like transmitted from the master 12, the confirmation signal detection unit 23 is capable of confirming that the slave 13 has successfully received the command, data, or the like. On the other hand, in the case where the confirmation signal detection unit 23 detects NACK transmitted from the slave 13 from a command, data, or the like transmitted from the master 12, the confirmation signal detection unit 23 is capable of confirming that the slave 13 has failed in the reception of the command, data, or the like.

In the case where the confirmation signal detection unit 23 detects NACK, the conflict avoiding unit 24 instructs the transmission/reception unit 21 to transmit an abort signal for instructing to interrupt communication after ignoring a predetermined number of bits following NACK, as will be described later with reference to FIG. 3, for example. Accordingly, the conflict avoiding unit 24 is capable of preventing conflict with read data transmitted from the slave 13 and an HDR termination command transmitted from the master 12 from occurring, for example.

Further, in the case where the transmission/reception unit 21 receives a preamble for instructing to transmit a CRC word and the error detection unit 22 detects that the signal received following the preamble has a token error or CRC error, the conflict avoiding unit 24 transmits a clock depending on the number of bits corresponding to the difference between the CRC word and the read data following the preamble before instructing the transmission/reception unit 21 to transmit an abort signal for instructing to interrupt communication. Accordingly, the conflict avoiding unit 24 is capable of preventing conflict with the read data transmitted from the slave 13 and the HDR termination command transmitted from the master 12 from occurring, for example.

The slave 13 includes a transmission/reception unit 31 and an error detection unit 32.

The transmission/reception unit 31 transmits/receives a signal to/from the master 12 via the data signal line 14-1 and the clock signal line 14-2. For example, the transmission/reception unit 31 receives a signal transmitted from the master 12 that drives the data signal line 14-1 in accordance with timing of serial clocks of the clock signal line 14-2. Further, the transmission/reception unit 31 transmits a signal to the master 12 by driving the data signal line 14-1 in accordance with timing of serial clocks of the clock signal line 14-2.

The error detection unit 32 detects that the signal received by the transmission/reception unit 31 has an error similarly to the error detection unit 22 of the master 12. Then, in the case where the signal received by the transmission/reception unit 31 has no error, the error detection unit 32 causes the transmission/reception unit 31 to transmit ACK, which represents that the command, data, or the like transmitted by the signal has been successfully received, to the master 12. On the other hand, in the case where the signal received by the transmission/reception unit 31 has an error, the error detection unit 32 causes the transmission/reception unit 31 to transmit NACK, which represents that the command, data, or the like transmitted by the signal has failed to be received, to the master 12.

Further, in the case where the signal received by the transmission/reception unit 31 has an error and it is hard to perform normal communication, for example, the error detection unit 32 ignores the subsequent communication, stops responding to the master 12, and causes the slave 13 to be in a standby state.

Since the bus IF 11 is configured as described above, the master 12 and the slave 13 are capable of transmitting/receiving a signal via the data signal line 14-1 and the clock signal line 14-2, and it is possible to perform communication more reliably by preventing conflict from occurring with the conflict avoiding unit 24.

<Description of Conflict Occurrence>

Now, conflict occurrence will be described with reference to FIG. 2 before describing a method of preventing conflict from occurring with the conflict avoiding unit 24.

In the bus IF 11, it is prescribed that a signal of two bits called preamble is used to designate the type of data to be transmitted next in the DDR mode. Incidentally, because error detection with party or CRC is not prepared in the preamble, it is difficult to detect an error when the error has occurred in the preamble.

For example, in the preamble after the master 12 transmits a read command for instructing to read data to the slave 13, it is prescribed that the first bit is driven by the master 12 and the second bit is driven by the slave 13. Then, the slave 13 is capable of transmitting ACK or NACK with the second bit. For example, ACK representing that reception of the read command has succeeded is prescribed to drive the second bit of the preamble that has transmitted the read command to 0. On the other hand, NACK representing that the reception of the read command has failed is prescribed to drive the second bit of the preamble that has transmitted the read command to 1.

However, in the case where 1 bit error in which the value of 1 bit is inverted has occurred in the second bit of this preamble, the master 12 erroneously recognizes ACK and NACK, for example.

Figure 2:
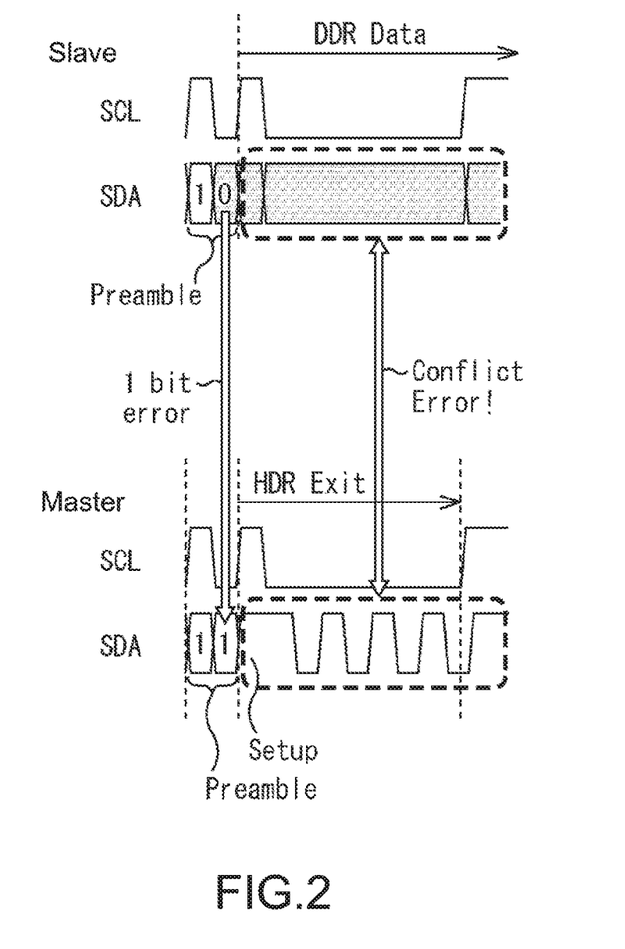
FIG. 2 is a diagram describing a conflict error.

Specifically, as shown in the upper side of FIG. 2, the slave 13 drives the second bit of the preamble to 0 (i.e., transmits ACK) in the case where the reception of the read command has succeeded, and transmits read data (DDR Data) following the preamble. Note that the hatched part in FIG. 2 represents that it is driven by the slave 13.

On the other hand, in the case where 1 bit error has occurred in the second bit of the preamble and the second bit of the preamble is 1 as shown in the lower side of FIG. 2, the master 12 erroneously recognizes that NACK is transmitted from the slave 13. Therefore, in this case, the master 12 transmits an HDR termination command (HDR Exit), which instructs to terminate communication in the HDR mode, in response to the erroneous recognition that the slave 13 has failed to receive the read command.

Accordingly, there is fear that the read data transmitted from the slave 13 and the HDR termination command transmitted from the master 12 conflict. Therefore, after that, even if the master 12 transmits an HDR termination command, the slave 13 cannot terminate the HDR mode because it is difficult for the slave 13 to normally receive the HRD termination command. Accordingly, the bus IF 11 is assumed to be deadlocked and be in an incommunicable state.

In view of the above, in the bus IF 11, it is prescribed that when NACK is detected, the master 12 transmits an abort signal for instructing to interrupt communication after ignoring a predetermined number of bits following NACK. Accordingly, even when the above-mentioned 1 bit error has occurred, it is possible to prevent the read data transmitted from the slave 13 and the HDR termination command transmitted from the master 12 from conflicting.

<Description of Conflict Prevention>

Figure 3:
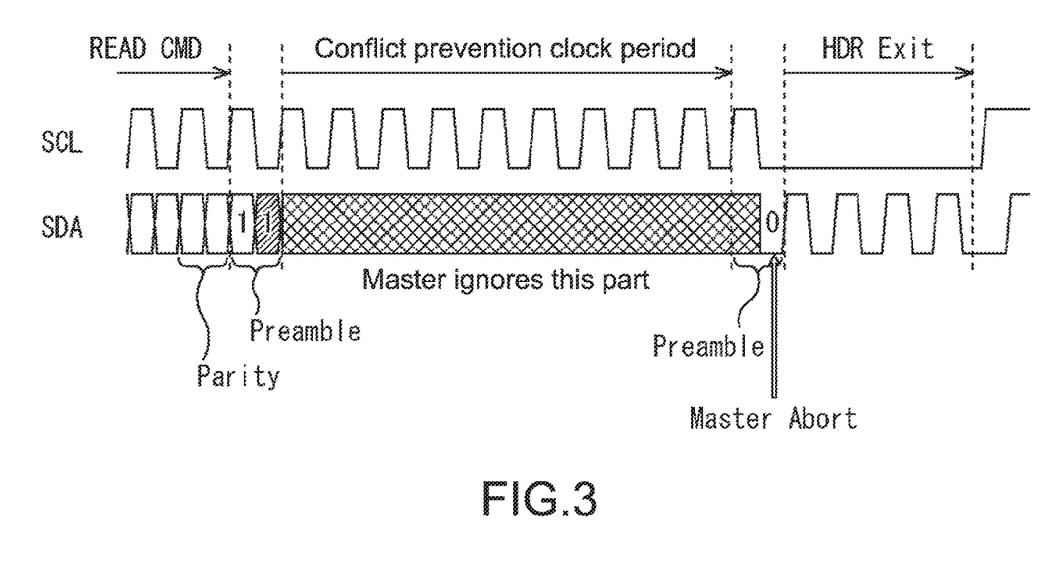
FIG. 3 is a diagram showing an example of a format for avoiding the conflict error.

In FIG. 3, a format when the master 12 has received NACK to prevent conflict from occurring due to the 1 bit error occurred on the second bit of the preamble after the read command is transmitted in the bus IF 11 is shown.

As shown in FIG. 3, in the bus IF 11, in the case where the master 12 detects that the second bit of the preamble after transmitting the read command (READ CMD) is 1, 18 bits (which is the same as the number of bits of the read data transmitted in response to the read command) following the preamble transmitted subsequent to the read command is prescribed as a conflict prevention clock period. Then, in the bus IF 11, it is prescribed that the master 12 ignores the conflict prevention clock period and the first bit of the preamble following the conflict prevention clock period (i.e., 19 bits following NACK), and transmits a clock corresponding to the number of bits before driving the second bit of the preamble to 0.

Note that in the bus IF 11, it is prescribed that the slave 13 transmits read data of 18 bits following the subsequent preamble when receiving the read command. Further, in the bus IF 11, it is prescribed that after the slave 13 transmits the read data, the first bit is driven by the slave 13 and the second bit is driven by the master 12 in the preamble. Then, in the bus IF 11, an abort signal for instructing to perform master abort in which the master 12 interrupts communication with the slave 13 in the case where the second bit of this preamble is 0 is prescribed. Note that in order to reliably perform the master abort, driving of the second bit of the preamble transmitted/received following the read data is performed by the master 12.

Therefore, in the case where the second bit of the preamble following the conflict prevention clock period is driven to 0 as shown in FIG. 3, i.e., the master 12 transmits an abort signal at a timing of the second bit of the preamble of two bits transmitted/received following read data when the read data is transmitted from the slave 13, the slave 13 is capable of aborting the transmission of the read data by detecting that the master 12 has transmitted an abort signal. Accordingly, when the master 12 transmits an HDR termination command (HDRExit) following this preamble, the slave 13 is capable of terminating the HDR mode in accordance with the HDR termination command. After that, the master 12 and the slave 13 perform communication again in the SDR mode.

That is, the master 12 does not transmit the HDR termination command right after detecting NACK as shown in FIG. 2. As shown in FIG. 3, the master 12 additionally transmits a clock corresponding to the conflict prevention clock period after detecting HACK, and transmits an HRD termination command after the preamble following the conflict prevention clock period.

Accordingly, even when the master 12 detects that the second bit of the preamble after the read command is transmitted is 1 (i.e., NACK), it is possible to prevent conflict described with reference to FIG. 2 from occurring. That is, even when the master 12 erroneously recognizes ACK transmitted from the slave 13 as NACK, it is possible to prevent the bus IF 11 from being deadlocked and perform communication more reliably.

<Communication Method of Preventing Conflict Occurrence>

Figure 4:
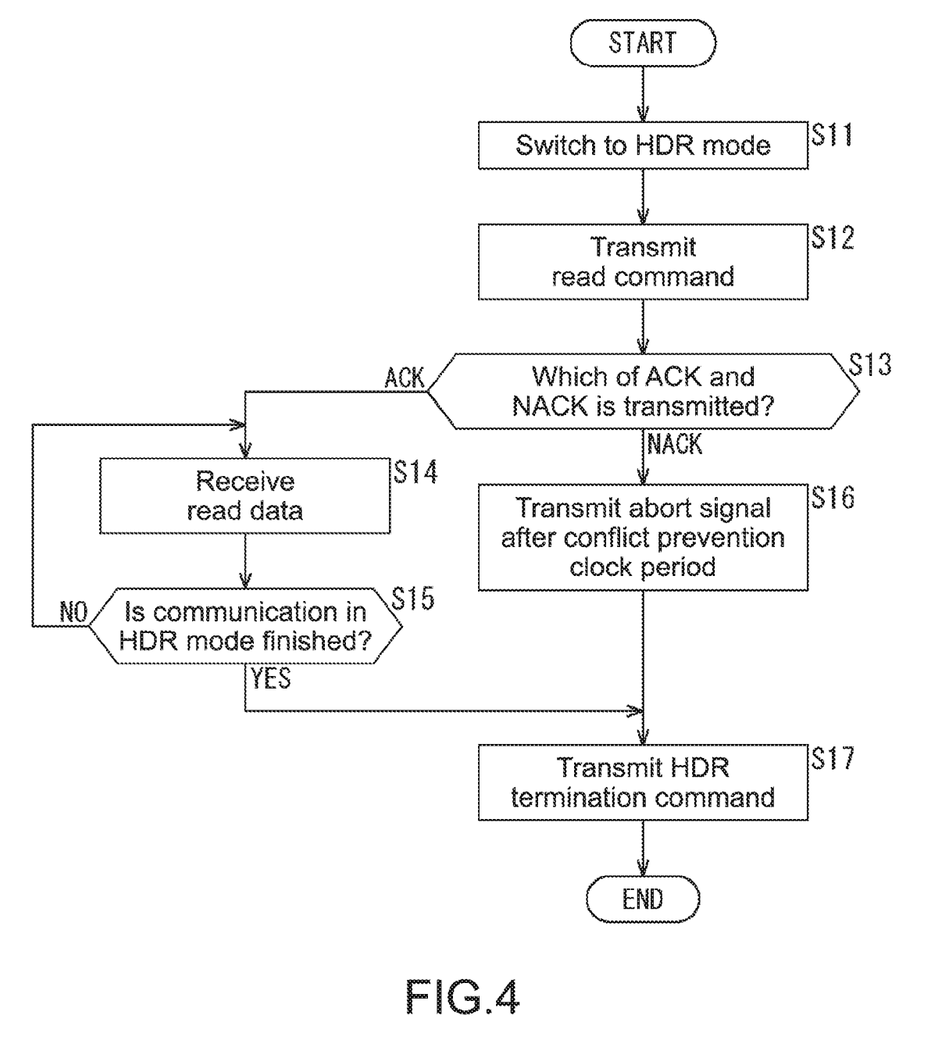
FIG. 4 is a flowchart describing communication processing of a master in a DDR mode.

FIG. 4 is a flowchart describing communication processing (DDR Read) in which the master 12 reads data from the slave 13 in a DDR mode that is one of the HDR mode.

In Step S11, the master 12 executes processing of switching the communication from the SDR mode to the HDR mode. Specifically, in the master 12, the transmission/reception unit 21 drives the data signal line 14-1 and the clock signal line 14-2, and transmits a broadcast command (0x7E+R/W=0) that notifies that a command is concurrently transmitted to all of the slaves 13 constituting the bus IF 11 in the SDR mode. After that, in the master 12, when the confirmation signal detection unit 23 receives ACK transmitted from the slave 13 to confirm that reception of the broadcast command has succeeded, the transmission/reception unit 21 transmits a common command code (ENTHDR CCC(0x20)) for switching to the HDR mode.

In Step S12, the transmission/reception unit 21 of the master 12 drives the data signal line 14-1 and the clock signal line 14-2 to transmit a read command.

In Step S13, the confirmation signal detection unit 23 detects the value of the second bit of the preamble after the read command is transmitted, and determines which of ACK and NACK is transmitted from the slave 13. Specifically, in the case where the confirmation signal detection unit 23 detects that the second bit of the preamble after the read command is transmitted is 0, the confirmation signal detection unit 23 determines that ACK is transmitted from the slave 13. On the other hand, in the case where the confirmation signal detection unit 23 detects that the second bit of the preamble after the read command is transmitted is 1, the confirmation signal detection unit 23 determines that NACK is transmitted from the slave 13.

In Step S13, in the case where the confirmation signal detection unit 23 determines that ACK is transmitted from the slave 13, the processing proceeds to Step S14. The transmission/reception unit 21 receives read data transmitted following the preamble. Further, the transmission/reception unit 21 receives also the preamble transmitted following the read data.

After that, the processing proceeds to Step S15, and the transmission/reception unit 21 determines whether or not the communication in the HDR mode is finished. For example, in the case where the preamble transmitted following the read data represents that read data is to be transmitted following the preamble, the transmission/reception unit 21 determines that the communication in the HDR mode is not finished, the processing returns to Step S14, and the communication in the HDR mode is continued. On the other hand, for example, in the case where the preamble transmitted following the read data represents that a CRC word is to be transmitted following the preamble, the transmission/reception unit 21 determines that the communication in the HDR mode is finished, and receives the CRC word before the processing proceeds to Step S17.

On the other hand, in the case where the confirmation signal detection unit 23 determines that NACK is transmitted from the slave 13 in Step S13, the processing proceeds to Step S16.

In Step S16, the conflict avoiding unit 24 instructs the transmission/reception unit 21 to transmit an abort signal for instructing to interrupt communication after ignoring a predetermined number of bits following NACK. In accordance therewith, as described above with reference to FIG. 3, the transmission/reception unit 21 transmits the abort signal to the slave 13.

After the processing of Step S16, the processing proceeds to Step S17, and the transmission/reception unit 21 transmits an HDR termination command following the abort signal. Further, also in the case where it is determined that the communication is switched from the HDR mode to the SDR mode in Step S15, the transmission/reception unit 21 transmits an HDR command in Step S17. Accordingly, the communication processing (DDR Read) in which the master 12 reads data from the slave 13 in the DDR mode is finished.

As described above, in the bus IF 11, it is possible to perform communication more reliably by preventing conflict from occurring even in the case where NACK is detected in the master 12 and the NACK is derived from ACK on which the 1 bit error has occurred.

<Circuit Diagram of Master>

Figure 5:
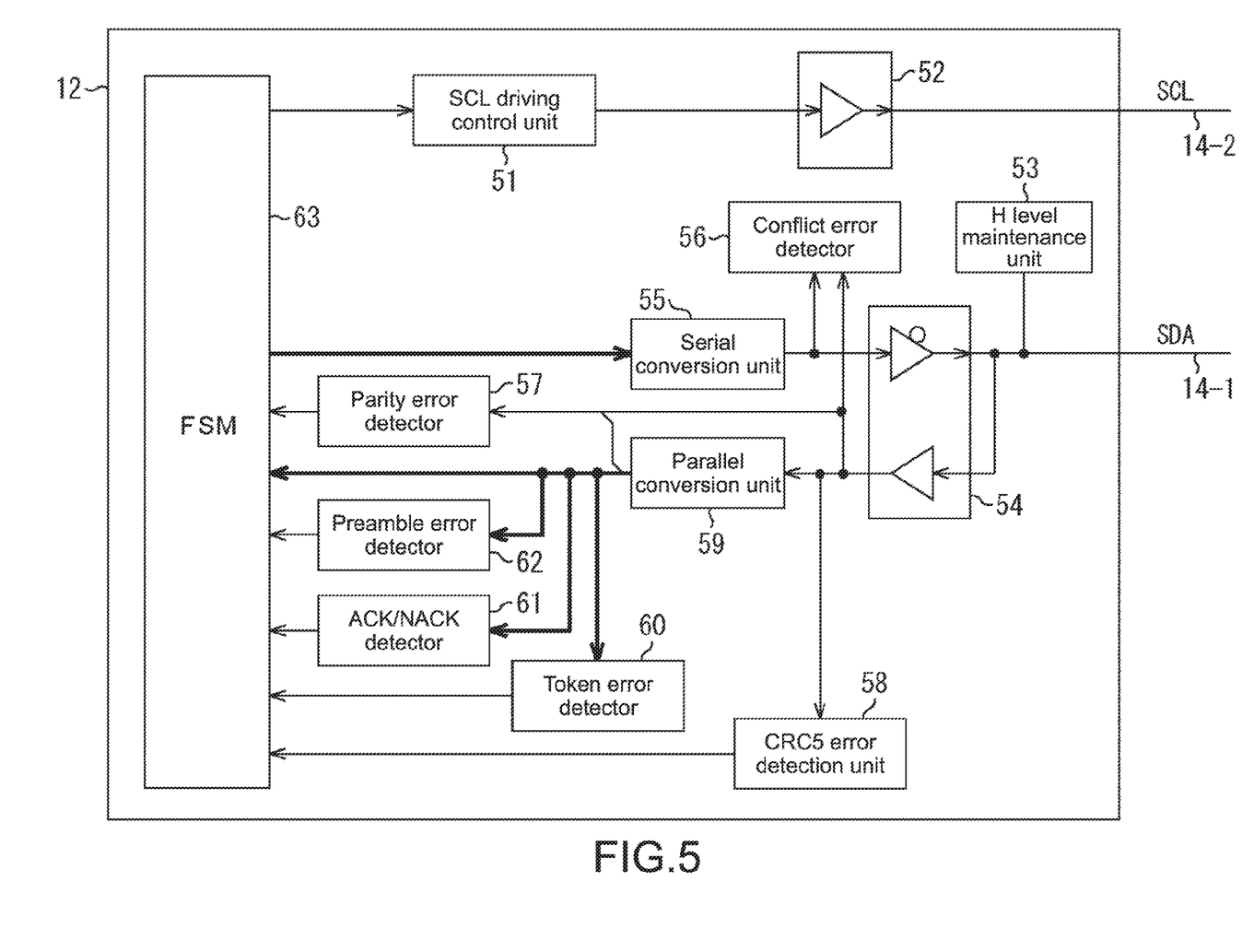
FIG. 5 is a circuit diagram showing a configuration example of the master.

Next, FIG. 5 is a circuit diagram showing a configuration example of the master 12.

As shown in FIG. 5, the master 12 includes a SCL driving control unit 51, an amplification unit 52, an H level maintenance unit 53, an amplification unit 54, a serial conversion unit 55, a conflict error detector 56, a parity error detector 57, a CRC5 error detection unit 58, a parallel conversion unit 59, a token error detector 60, an ACK/NACK detector 61, a preamble error detector 62, and a state machine (FSM:Finite State Machine) 63.

The SCL driving control unit 51 generates a serial clock to be supplied to the slave 13 via the clock signal line 14-2 in accordance with the signal of a reference frequency output from the state machine 63 to control driving of the clock signal line 14-2.

The amplification unit 52 amplifies the clock signal generated by the SCL driving control unit 51 to a predetermined level necessary for being transmitted via the clock signal line 14-2, and outputs it to the clock signal line 14-2.

The H level maintenance unit 53 maintains the level of the data signal line 14-1 at the H level.

The amplification unit 54 amplifies serial data to be transmitted via the data signal line 14-1 to a predetermined level, outputs it, and amplifies serial data transmitted via the data signal line 14-1 to a level necessary for being processed in the master 12.

The serial conversion unit 55 converts parallel data output from the state machine 63 into serial data, and outputs it.

The conflict error detector 56 detects a conflict error on the data signal line 14-1 by comparing serial data output from the serial conversion unit 55 and serial data transmitted via the data signal line 14-1.

The parity error detector 57 uses data of 5 bits added for detecting a bit error on the basis of an even-number or odd number to detect an error of the serial data transmitted via the data signal line 14-1, and notifies the state machine 63 of the error detection result.

The CRC5 error detection unit 58 uses data of 5 bits added for detecting a bit error on the basis of the CRC to detect an error of the serial data transmitted via the data signal line 14-1, and notifies the state machine 63 of the error detection result.

The parallel conversion unit 59 converts the serial data transmitted via the data signal line 14-1 into parallel data, and outputs it.

The token error detector 60 detects whether or not a token has an error by checking the bit sequence of the token contained in the parallel data converted by the parallel conversion unit 59, and notifies the state machine 63 of the error detection result.

The ACK/NACK detector 61 corresponds to the confirmation signal detection unit 23 in FIG. 1, and detects ACK or NACK transmitted from the slave 13 from the parallel data converted by the parallel conversion unit 59, and notifies the state machine 63 of the detection result (ACK/NACK).

The preamble error detector 62 detects whether or not a preamble contained in the parallel data converted by the parallel conversion unit 59 has an error, and notifies the state machine 63 of the error detection result.

The state machine 63 is a sequential circuit in which the next state is determined by the input conditions and the current state, and functions as the transmission reception unit 21 and the conflict avoiding unit 24 in FIG. 1. Specifically, the state machine 63 is in a state of receiving read data in the case where the detection result obtained from the ACK/NACK detector 61 is ACK with the detection result of ACK or NACK obtained by the ACK/NACK detector 61 as an input. On the other hand, in the case where the detection result obtained by the ACK/NACK detector 61 is NACK, the state machine 63 ignores the conflict prevention clock period and the first bit following the conflict prevention clock period, and is in a state of transmitting an abort signal.

The master 12 is configured as described above, and it is possible to prevent the bus IF 11 from being deadlocked and perform communication more reliably even when ACK transmitted by the slave 13 is erroneously recognized as NACK as described above.

Note that although an example in which the master 12 transmits an HDR termination command following the preamble subsequent to the conflict prevention clock period is described in the above-mentioned embodiment, it does not necessarily need to transmit the HDR termination command as long as communication can be recovered by preventing conflict from occurring.

Figure 6:
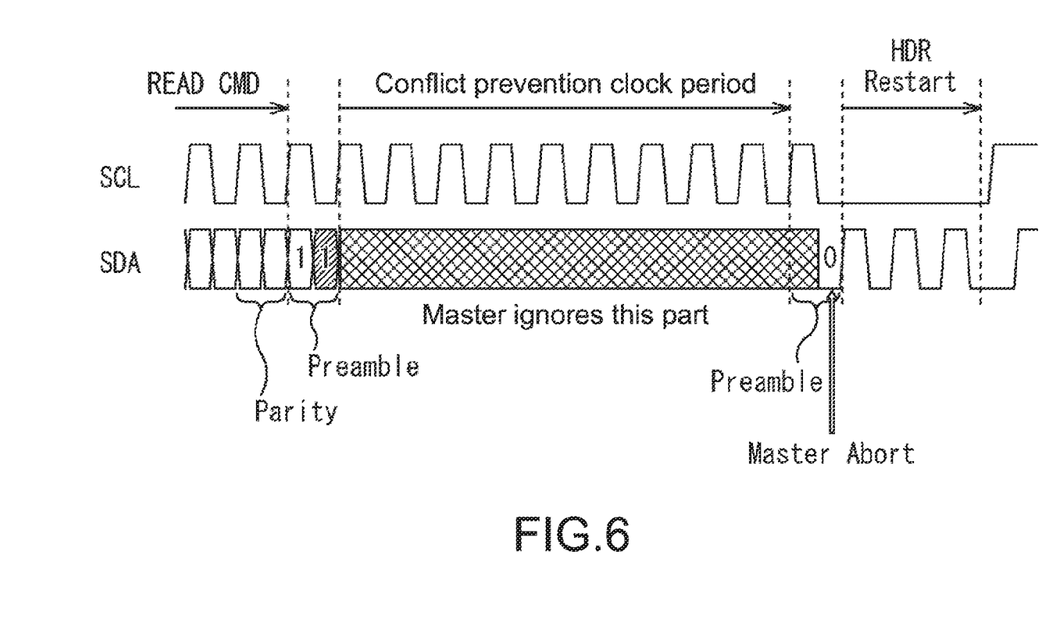
FIG. 6 is a diagram showing another example of the format for avoiding the conflict error.

For example, as shown in FIG. 6, the master 12 may transmit a restart command (HDR Restart) for instructing to restart communication in the HDR mode following the preamble subsequent to the conflict prevention clock period instead of the HDR termination command in FIG. 3. As described above, in the bus IF 11, it is possible to perform communication in the MDR mode again by the master 12 transmitting the restart command after interrupting communication in accordance with the master abort.

Note that the present technology is not limited to the bus IF 11 in accordance with the I3C standard, and can be applied to the bus IF 11 in accordance with other standards. Further, although a configuration example in which the slaves 13-1 to 13-3 are connected to each other in the bus IF 11 shown in FIG. 1 is shown, the number of slaves 13 may be one, two, or three or more, for example.

Note that the processing described with reference to the above-mentioned flowcharts does not necessarily need to be performed in time series in the order described as the flowcharts and also includes processing that are carried out in parallel or individually (e.g., parallel processing or processing that uses object). Further, the program may be processed by one CPU, or may be processed dispersively by a plurality of CPUs.

Further, the "system" means an entire apparatus including a plurality of apparatuses herein.

Further, the above-mentioned sequence of processing can be executed by hardware or software. If the sequence of processing is executed by software, programs configuring the software are installed into a computer from a program recording medium in which the programs are stored. Here, the computer includes a computer incorporated in dedicated hardware and, for example, a generally-used personal computer that installs various programs to be able to execute various functions.

<Configuration Example of Hardware>

Figure 7:
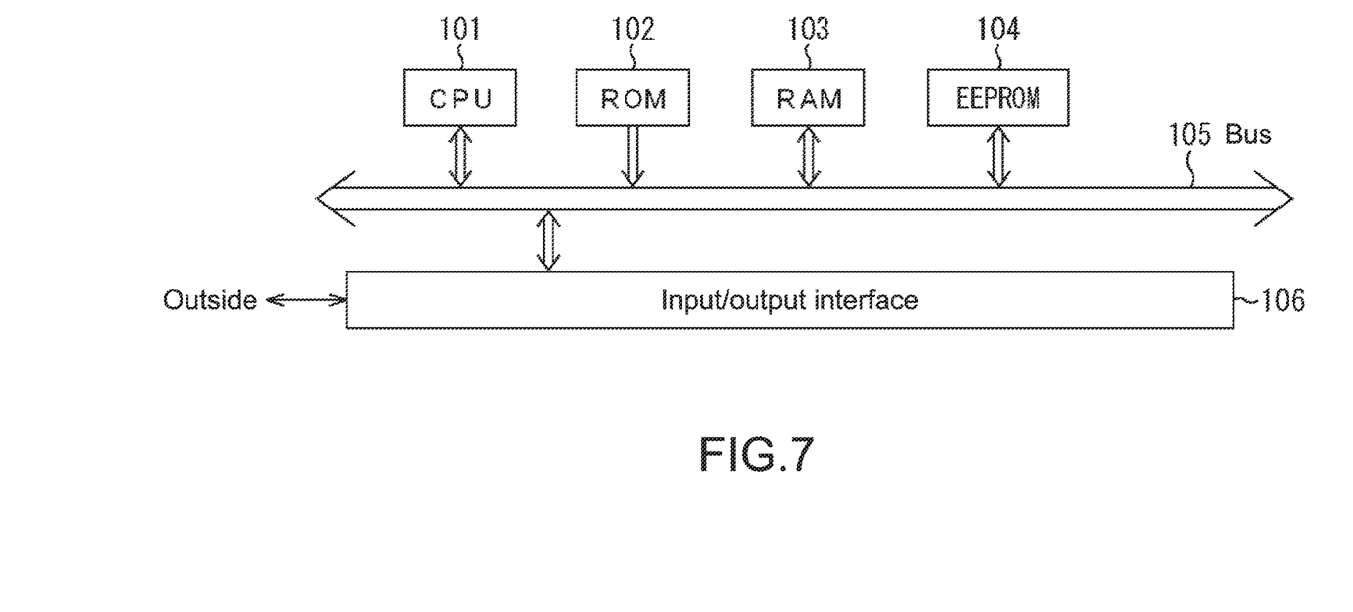
FIG. 7 is a block diagram showing a configuration example of an embodiment of a computer to which the present technology is applied.

FIG. 7 is a block diagram showing a configuration example of hardware of a computer that executes the above-mentioned sequence of processing by programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are mutually connected via a bus 105. To the bus 105, further connected is an input/output interface 106. The input/output interface 106 is connected to the outside (e.g., the data signal line 14-1 and the clock signal line 14-2 in FIG. 1).

In the computer configured as described above, by the CPU 101 loading programs stored in, for example, the ROM 102 and the EEPROM 104 into the RAM 103 via the bus 105 and executing the programs, the above-mentioned sequence of processing is performed. Further, the programs executed by the computer (CPU 1.01) can be stored in the ROM 102 in advance. Alternatively, the programs can be installed into the EEPROM 104 from the outside via the input/output interface 106 or updated.

It should be noted that the present technology may take the following configurations.

(1)

A communication apparatus, including:

a transmission/reception unit that transmits/receives a signal to/from a different apparatus;

a confirmation signal detection unit that detects one of a reception confirmation signal and a non-reception confirmation signal, the reception confirmation signal and the non-reception confirmation signal being transmitted from the different apparatus that has received the signal transmitted from the transmission/reception unit; and a conflict avoiding unit that instructs the transmission/reception unit to transmit an abort signal for instructing to interrupt communication after ignoring a predetermined number of bits following the non-reception confirmation signal when the confirmation signal detection unit has detected the non-reception confirmation signal.

(2)

The communication apparatus according to (1) above, in which the transmission/reception unit transmits clocks when the non-reception confirmation signal is detected, the number of clocks being the same as the predetermined number.

(3)

The communication apparatus according to (2) above, in which the transmission/reception unit transmits a clock corresponding to the number of bits of read data transmitted from the different apparatus in response to transmission of a read command for instructing the different apparatus to read data, and ignores a signal in at least a period for transmitting the clock.

(4)

The communication apparatus according to (3) above, in which the transmission/reception unit transmits the abort signal at a timing of the second bit of a preamble of two bits when the read data is transmitted from the different apparatus, the preamble being transmitted/received following the read data.

(5)

The communication apparatus according to any one of (1) to (4) above, in which the transmission/reception unit transmits a command for instructing to terminate a particular communication mode following the abort signal.

(6)

The communication apparatus according to any one of (1) to (4) above, in which the transmission/reception unit transmits a command for instructing to restart communication in a particular communication mode following the abort signal.

(7)

The communication apparatus according to any one of (1) to (6) above, further including an error detection unit that detects an error by comparing a bit sequence of a signal received following a preamble for designating a type of data to be transmitted next and a bit sequence to be transmitted in the type designated by the preamble to be transmitted, the preamble being received by the transmission/reception unit, in which the conflict avoiding unit instructs the transmission/reception unit to transmit an abort signal for instructing to interrupt communication after transmitting a clock corresponding to a predetermined number of bits following the preamble when the error detection unit detects the error.

(8)

The communication apparatus according to any one of (1) to (7) above, in which the transmission/reception unit receives read data transmitted from the different apparatus, and drives the second bit of a preamble transmitted/received after the read data.

(9)

The communication apparatus according to (7) above, in which the error detection unit detects an error by performing parity check on data received by the transmission/reception unit with one bit out of parity of two bits contained in the data as an even-numbered parity and the other hit as an odd-numbered parity.

(10)

The communication apparatus according to any one of (1) to (9) above, in which the transmission/reception unit is capable of transmitting/receiving a signal in an SDR (Standard Data. Rate) mode and an HDR (High Data Rate) mode, data communication being performed at a normal transfer rate in the SDR mode, the data communication being performed at a transfer rate higher than that of the SDR mode in the HDR mode.

(11)

The communication apparatus according to any one of (1) to (10) above, in which the transmission/reception unit performs communication via two signal lines of a data signal line and a clock signal line, serial data being successively transmitted one bit at a time via the data signal line, a serial clock of a predetermined frequency being transmitted via the clock signal line.

(12)

The communication apparatus according to any one of (1) to (11) above, in which the transmission/reception unit performs communication conforming to the I3C (Improved Inter Integrated Circuit) standard.

(13)

A communication method, including:

transmitting/receiving a signal to/from a different apparatus;

detecting one of a reception confirmation signal and a non-reception confirmation signal, the reception confirmation signal and the non-reception confirmation signal being transmitted from the different apparatus that has received the transmitted signal; and transmitting an abort signal for instructing to interrupt communication after ignoring a predetermined number of bits following the non-reception confirmation signal when the non-reception confirmation signal has been detected.

(14)

A program that causes a computer to execute communication processing including the steps of:

transmitting/receiving a signal to/from a different apparatus;

detecting one of a reception confirmation signal and a non-reception confirmation signal, the reception confirmation signal and the non-reception confirmation signal being transmitted from the different apparatus that has received the transmitted signal; and transmitting an abort signal for instructing to interrupt communication after ignoring a predetermined number of bits following the non-reception confirmation signal when the non-reception confirmation signal has been detected.

(15)

A communication system, including:

a first communication apparatus that takes an initiative in control in a bus; and a second communication apparatus that performs communication in accordance with control by the first communication apparatus, in which the first communication apparatus includes a transmission/reception unit that transmits/receives a signal to/from the second communication apparatus;

a confirmation signal detection unit that detects one of a reception confirmation signal and a non-reception confirmation signal, the reception confirmation signal and the non-reception confirmation signal being transmitted from the second communication apparatus that has received the signal transmitted from the transmission/reception unit; and a conflict avoiding unit that instructs the transmission/reception unit to transmit an abort signal for instructing to interrupt communication after ignoring a predetermined number of bits following the non-reception confirmation signal when the confirmation signal detection unit has detected the non-reception confirmation signal.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 bus IF
12 master
13 slave
14-1 data signal line
14-2 clock signal line
21 transmission/reception unit
22 error detection unit
23 confirmation signal detection unit
24 conflict avoiding unit
31 transmission/reception unit
32 error detection unit
51 SCL driving control unit
52 amplification unit
53 H level maintenance unit
54 amplification unit
55 serial conversion unit
56 conflict error detector
57 parity error detector
58 CRC5 error detection unit
59 parallel conversion unit
60 token error detector
61 ACK/NACK detector
62 preamble error detector
63 state machine

The invention claimed is:

1. A communication device, comprising:
transmission and reception circuitry configured to communicate with an external communication device, including transmitting and receiving data via a data signal line and transmitting a clock via a clock signal line; and control circuitry configured to
detect at least one of an acknowledgement signal or an absence of an acknowledgement signal transmitted from the external communication device in response to a signal from the transmission and reception circuitry; and in a case where the control circuitry detects the absence of an acknowledgement signal, cause the transmission and reception circuitry to prevent a conflict for at least a predetermined number of bits following the absence of an acknowledgement signal, wherein the transmission and reception circuitry is configured to maintain the data signal line at an H level during a period in which the transmission and reception circuitry is preventing the conflict.

2. The communication device according to claim 1, wherein the detection of the absence of the acknowledgement signal by the control circuitry is a result of a one-bit error in a second bit of a preamble transmitted from the external communication device.

3. The communication device according to claim 1, wherein the control circuitry includes a state machine configured to ignore the received data for a conflict prevention clock period having a duration corresponding to at least the predetermined number of bits following the absence of an acknowledgement signal.

4. The communication device according to claim 1, wherein the transmission and reception circuitry transmits a number of clock cycles when the absence of an acknowledgement signal is detected, the number of clock cycles being the same as the predetermined number of bits following the absence of an acknowledgement signal.

5. The communication device according to claim 1, wherein the transmission and reception circuitry transmits a clock for a duration corresponding to at least the predetermined number of bits of the data transmitted from the external communication device in response to a transmission of a read command and prevents conflict with the data for at least a period for transmitting the number of clock cycles.

6. The communication device according to claim 5, wherein the transmission and reception circuitry transmits the command signal at a timing of a second bit of a preamble of the signal when the data is transmitted from the external communication device.

7. The communication device according to claim 1, wherein the transmission and reception circuitry transmits a command instructing to terminate a particular communication mode following a conflict prevention clock period, wherein the conflict prevention clock period has a duration corresponding to at least the predetermined number of bits following the absence of an acknowledgement signal.

8. The communication device according to claim 1, wherein the transmission and reception circuitry transmits a command instructing to restart communication in a particular communication mode following a conflict prevention clock period, wherein the conflict prevention clock period has a duration corresponding to at least the predetermined number of bits following the absence of an acknowledgement signal.

9. The communication device according to claim 1, wherein the control circuitry is configured to detect an error by comparing a first bit sequence following a preamble of the data received by the transmission and reception circuitry to a second bit sequence corresponding to a data type designated by the preamble, and in a case where the control circuitry detects the error, the control circuitry causes the transmission and reception circuitry to transmit a command after transmitting a clock for a duration corresponding to at least a second predetermined number of bits after the preamble.

10. The communication device according to claim 1, wherein the control circuitry detects an error by performing parity check on the data received by the transmission and reception circuitry wherein a first parity bit contained in the received data is an even-numbered parity and a second bit contained in the received data is an odd-numbered parity.

11. The communication device according to claim 1, wherein the transmission and reception circuitry drives a second bit of a preamble transmitted or received following a read data.

12. The communication device according to claim 1, wherein the transmission and reception circuitry is configured to communicate in an SDR (Standard Data Rate) mode and an HDR (High Data Rate) mode, data communication being performed at a first transfer rate in the SDR mode, the data communication being performed at a second transfer rate higher than the first transfer rate in the HDR mode.

13. The communication device according to claim 12, wherein the control circuitry is configured to detect an error in a preamble immediately after transmitting a read command in the HDR mode and immediately before a read data.

14. The communication device according to claim 12, wherein the HDR mode includes a plurality of additional modes in which the transmission and reception circuitry is capable of communicating, the plurality of additional modes including: a double data rate mode, a ternary symbol pure-bus mode, and a ternary symbol legacy-inclusive-bus mode.

15. The communication device according to claim 12, wherein the communication device is further configured to switch a mode of the external communication device via a mode change signal.

16. The communication device according to claim 1, wherein the data signal line sequentially transmits serial data bit by bit, and the clock signal line transmits a serial clock having a predetermined frequency.

17. A communication system, comprising:
a first communication device having a control initiative in a bus including a data signal line and a clock signal line; and
a second communication device configured to perform communication in accordance with the control initiative of the first communication device,
wherein the first communication device includes
first transmission and reception circuitry configured to communicate with the second communication device, including transmitting and receiving data via the data signal line and transmitting a clock via a clock signal line; and
control circuitry configured to
detect at least one of an acknowledgement signal or an absence of an acknowledgement signal transmitted from the second communication device in response to a signal from the first transmission and reception circuitry; and
in a case where the control circuitry detects the absence of an acknowledgement signal, cause the first transmission and reception circuitry to prevent a conflict for at least a predetermined number of bits following the absence of an acknowledgement signal, and
the second communication device includes second transmission and reception circuitry configured to communicate with the first communication device, including transmitting and receiving data via the data signal line and receiving the clock via the clock signal line, wherein
the first transmission and reception circuitry is configured to maintain the data signal line at an H level during a period in which the first transmission and reception circuitry is preventing the conflict.

18. The communication system according to claim 17, further comprising:
a third communication device configured to communicate in accordance with the control initiative of the first communication device, wherein
one of the second communication device and the third communication device does not transmit the acknowledgement signal,
the other of the second communication device and the third communication device transmits the acknowledgement signal, and
the control circuitry is configured to detect that the one of the second communication device and the third communication device did not transmit the acknowledgement signal.

19. A communication method for a communication device, the method comprising:
communicating with an external communication device, including transmitting and receiving data via a data signal line and transmitting a clock via a clock signal line;
detecting at least one of an acknowledgement signal or an absence of an acknowledgement signal transmitted from the external communication device in response to a signal from transmission and reception circuitry; and
in a case where control circuitry detects the absence of an acknowledgement signal, preventing a conflict for at least a predetermined number of bits following the absence of an acknowledgement signal; and
maintaining the data signal line at an H level during a period of preventing the conflict.

* * * * *